Patented Oct. 20, 1931

1,827,820

UNITED STATES PATENT OFFICE

GUSTAF NEWTON KIRSEBOM, OF TROLLHATTAN, SWEDEN

TREATMENT OF METALS AND/OR THEIR COMPOUNDS

No Drawing.  Application filed May 29, 1929. Serial No. 367,138.

This invention relates to the treatment of metals and/or their compounds, and has for its object the provision of improvements in the method of treating a mixture of metals and/or their compounds for the separation and recovery of one or more of the metals. The invention also contemplates the separation and recovery of valuable by-products in the process of treating a mixture of metals and/or their compounds. More particularly, the invention aims to effect the separation of antimony and/or antimony and lead and tin as such from materials in which these metals exist as oxysalts in combination with alkali compounds, such as alkali hydrates, carbonates, chlorides, and the like, alone or in combination with one another.

In my copending application, Serial No. 293,709, filed July 18, 1928, I have disclosed and claimed certain improvements in the reduction of metallic compounds and in the production of arsenates. According to said copending application, metallic lead or lead alloys (such as cadmium-lead) may be produced from flue dust, and the like containing those metals when the dust is fused with caustic soda and made to react with arsenic trioxide. The present application, on the other hand, is more particularly directed to the treatment of caustic soda slags and the like obtained in the direct purification of impure lead by means of a suitable alkali compound.

The metallurgy of lead is complicated due to the tenacity with which contaminating metals accompany the ultimate lead product. This is particularly true of secondary or residual scrap leads. The contaminants are usually antimony, tin and arsenic, although silver, zinc and the like are also frequently found associated with the lead.

Lead manufacturers have tended gradually to employ the so-called Harris process for refining impure lead. According to this well known process, the impure lead is maintained in a molten state, at a temperature not exceeding about 500° C., while circulating the same through a molten reagent or reagent mixture consisting of caustic soda with or without sodium chloride and the like, to which is gradually added a solid oxidizing agent, such as sodium nitrate, until one or more of the impurities, such as arsenic, tin and antimony, has been oxidized and removed from the lead and is found in the resulting alkali mix. The lead itself is directly recovered in a substantially pure state. The impurities originally present in the lead remain suspended in the alkali mix.

The compounds present in the alkali mix are frequently referred to as "Harris salts". They generally comprise a mixture of the following: Sodium antimonate ($Na_3SbO_4$); sodium arsenate ($Na_3AsO_4$); sodium stannate ($Na_3SnO_4$); sodium plumbate $$(Na_2PbO_2);$$

sodium hydroxide (NaOH); sodium oxide ($Na_2O$); sodium chloride (NaCl); sodium carbonate ($Na_2CO_3$); sodium nitrate $$(NaNO_3);$$

and a few lead prills (Pb). Various proposals have been forwarded to treat these Harris salts in order to separate and recover their metallic values. They have met with indifferent success commercially.

It has been proposed, for example, to employ a series of leachings to remove the oxysalts of tin and arsenic from the caustic soda bath, the comparatively insoluble sodium antimonate being left behind. The separated antimony compound is dried and smelted in a reverberatory furnace. The objection to this method of treating the sodium antimonate is that, while the antimony may be recovered, the caustic soda combined with the sodium antimonate is permanently lost. This is undesirable because the caustic soda may advantageously be employed in treating further amounts of impure lead.

The sodium stannate is first removed from the spent caustic soda reagent by crystallization. This is accomplished by bringing the solution of spent caustic reagent to a concentration in caustic soda at which the sodium stannate is insoluble on cooling the solution, while most of the arsenic will remain soluble. The solution is then cooled and the insoluble sodium stannate is removed.

In order to obtain the sodium arsenate, the remaining solution is diluted with water until such a degree of concentration is reached that the sodium arsenate will crystallize out on cooling. The sodium arsenate crystals are then redissolved and subsequently precipitated with lime to form calcium arsenate.

It has also been proposed first to remove the arsenic and then the tin from the spent reagent containing sodium hydroxide and sodium chloride in controlled amounts. A solution strength is adopted in practice best adapted to retain both the oxysalts of arsenic and tin in solution while hot, but such as to throw down sodium arsenate when cooled while the sodium stannate remains in solution. The arsenate is separately recovered, while the stannate in solution is, for example, subjected to electrolysis for the recovery of its tin content.

The various methods of treating Harris salts hertofore employed require a large number of operations, as well as complicated equipment. The separation and recovery of the salts is usually very incomplete. Ideal working conditions are not readily obtainable from day to day in plant operations.

In the practice of the present invention, Harris salts and the like may be suitably treated effectively and economically to separate and recover one or more of their metallic values, while at the same time making possible the recovery of such valuable by-products as the caustic soda, which may subsequently be re-employed in purifying further amounts of impure lead.

According to the present invention, a complex mixture of metals and/or their compounds are subjected while in a molten state to the action of a regulated amount of a suitable arsenic compound, such as arsenic trioxide. The resulting regulus containing one or more of the metals present in the mixture is separated from the molten spent reagent. The spent reagent, containing one or more of the remaining metals and/or their compounds in solution, may be suitably treated with further amounts of arsenic trioxide adapted to reduce another metal or metals, which may be suitably separated and recovered from the remainder of the molten spent reagent.

In the practice of the present invention, for example, Harris salts while in a molten state are directly treated with arsenic trioxide or with appropriate materials containing arsenic trioxide in a suitable reaction vessel. The effect of the arsenic trioxide in the presence of caustic soda is to reduce the sodium nitrate present in the salts to ammonia. The arsenic trioxide itself is oxidized to sodium arsenate. The reaction may be indicated as follows:

(1) $NaNO_3 + 11NaOH + 2As_2O_3 = 4Na_3AsO_4 + NH_3 + 4H_2O$

When all the sodium nitrate present in the salts has been thus destroyed, the excess arsenic trioxide will react on the sodium antimonate (and the sodium plumbate, if present) to form antimony (and lead). These reactions may be set out as follows:

(2) $4Na_3SbO_4 + 5As_2O_3 + 18NaOH = 4Sb + 10Na_3AsO_4 + 9H_2O$
(3) $2Na_2PbO_2 + As_2O_3 + 2NaOH = 2Na_3AsO_4 + 2Pb + H_2O$

The reduced antimony and lead, along with any lead prills present in the salt, will separate and settle to the bottom of the reaction vessel, from which they may be removed as a lead-antimony alloy.

After the removal of the antimony (and lead, if present), more and more arsenic trioxide is gradually added to the molten mixture until it stiffens into a mass. At this stage of the process the melt will have become saturated with respect to sodium arsenate and the tin present in the mixture, in the absence of free caustic soda, will come out in the form of small tin prills. These tin prills may be removed from the melt by leaching away the soluble constituents of the mix. The prills are promptly removed from the spent reagent, and are preferably at once melted into ingots.

The remainder of the aqueous spent reagent, containing sodium arsenate in solution, is treated with lime, preferably in the form of milk of lime to form a precipitate of calcium arsenate and caustic soda.

(4) $2Na_3AsO_4 + 3Ca(OH)_2 = Ca_3(AsO_4)_2 + 6NaOH$

The calcium arsenate precipiate is separated from the liquid caustic soda. Caustic soda is thus made available for reuse in the treatment of further amounts of impure lead, and is a very valuable by-product. It is therefore seen that the caustic soda may always be regenerated and re-employed cyclically in the further treatment of impure lead.

While the specific example described above has been given with respect more particularly to socalled Harris salts, it will be apparent that the principles of the invention are applicable in the treatment of other mixtures of metals and/or their compounds. Under accurately controlled operating conditions, the arsenic trioxide can advantageously be employed to effect a selective action among the various different metallic compounds present in a mixture to be treated. In the illustration given above, a differential separation and recovery of metals was readily obtained. Under carefully regulated practice, a preferential extraction of metallic values may be obtained from a very complex mixture of metals and/or their compounds.

It will of course be apparent that the invention may be practiced with caustic soda slags obtained in the refining of bismuth, antimony, etc., as well as in the case of the caustic soda slags containing reducible metallic compounds obtained in the Harris process of refining impure lead. Electrolytic muds and metallic drosses in which a number of metals are present in partly oxidized form can be treated similarly by the present process with fused caustic soda and arsenic trioxide to separate the contained metals from each other.

In the preferred practice of the invention, the metals present in the mixture are for the most part first converted to oxysalts by treatment with a suitable alkali compound, such as caustic soda, in the presence of an oxidizing agent, such as sodium nitrate. When arsenic trioxide and caustic soda are melted down together, in the absence of a reducible compound, a mixture of sodium arsenate and sodium arsenite is formed with evolution of hydrogen. When, however, a reducible metal oxide is added to or is present in the fused caustic soda bath, the arsenic trioxide can be completely oxidized to sodium arsenate at the same time that the oxides of the metals are reduced to the metallic state. As a result sodium arsenate can be produced free, or substantially free, from sodium arsenite, the formation of arsenite being prevented, or any arsenite formed being oxidized to arsenate. At the same time the strongly reducing action resulting from the reaction of the arsenic trioxide and caustic soda is utilized for reducing the metallic oxide to the metallic state. The arsenic is thus recovered in the form of the oxidized salt, i. e., sodium arsenate, in which it can be employed as hereinbefore described, for the production of other arsenates, and particularly of calcium arsenate, with regeneration of the caustic soda for further use in the process.

In the treatment of Harris salts and the like, as above described, it is at times desirable to introduce certain reducible compounds to the caustic soda slag or melt. Such compounds, in the form of antimony oxide and/or cadmium dust and the like, are frequently available at smelters. Thus, lead smelters produce at the present time two kinds of dust. The roaster flue dust coming from the roasting furnaces contains mainly arsenic trioxide and lead oxide. The blast furnace flue dust coming from the blast furnaces consists mainly of cadmium oxide, arsenic trioxide and lead oxide. These flue dusts are commonly recovered in Cottrell plants and bag-houses. Dusts high in antimony oxide or cadmium oxide are also obtainable in other roasting or smelting operations.

Since antimony oxide dust and cadmium oxide dust are readily available around lead plants, it is highly desirable to employ these dusts in the actual treatment of the Harris salts. Such dusts may advantageously be employed in the treatment process of the invention, not only to recover their metallic values but to afford an opportunity for balancing the content of the mix in such manner as most effectively to practice the treatment operation.

It will be understood that the arsenic trioxide employed in the practice of the invention need not be used in a pure state, but can be used in the form of the more or less impure arsenic trioxide recovered from roasting and smelting furnaces. Hence, the use of the antimony and cadmium dusts above mentioned serves the added advantage of providing at least in part the necessary arsenic trioxide to effect the separation and recovery of metallic values in Harris salts.

Antimony oxide dust is advantageously added to the caustic slag before and/or during the initial treatment with arsenic trioxide. In my practice I prefer to introduce the antimony oxide dust into the melt at the same time as the sodium antimonate is reduced to metal. The reaction may be indicated as follows:

(5) 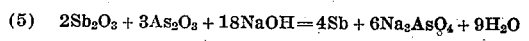
$2Sb_2O_3 + 3As_2O_3 + 18NaOH = 4Sb + 6Na_3AsO_4 + 9H_2O$

Provision must of course be made for the introduction into the melt of sufficient arsenic trioxide to effect the reduction of the antimony oxide dust added. The resulting antimony regulus is separated and removed from the slag.

The partially spent molten slag may next be mixed with cadmium oxide dust and appropriate amounts of arsenic trioxide. A cadmium-lead alloy will result, that may be subjected to electrolytic refining. The reaction may be set out in this manner:

(6) 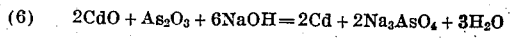
$2CdO + As_2O_3 + 6NaOH = 2Cd + 2Na_3AsO_4 + 3H_2O$

The major portion of the available cadmium forms as cathode cadmium. It is preferably melted and molded under oil to avoid surface oxidation. The anode scrap, containing cadmium and lead, is treated with sulfuric acid. A lead sludge forms as an under layer, while cadmium sulfate in solution forms above. They are suitably separated, as by decantation. The lead sludge is preferably returned to the lead pot containing the caustic soda slag at the beginning of the process, while the cadmium sulfate is cyclically returned for further electrolysis.

If the spent caustic slag from which antimony and cadmium have been removed contains the oxysalts of tin and/or arsenic, it is preferably treated as described above. In that manner its metallic tin content may be suitably recovered, and the sodium arsenate converted into marketable calcium arsenate.

I claim:

1. The method of treating so-called Harris salts which comprises subjecting the salts while molten to the action of arsenic trioxide in amount adapted to destroy all of the sodium nitrate present in the salts, adding further amounts of arsenic trioxide to the fused mixture whereby compounds of antimony present in the mixture are reduced, separating the antimony from the rest of the spent reagent, adding still further amounts of arsenic trioxide to the spent reagent until it becomes saturated with respect to sodium arsenate whereby any tin compounds present in the mixture are reduced to metallic tin, separating the tin from the rest of the reagent, subjecting the remaining solution appropriately diluted to lime in amount adapted to convert all of the available arsenic to calcium arsenate, and separating the calcium arsenate from the resulting caustic soda.

2. The method of treating so-called Harris salts which comprises adding arsenic trioxide to the salts while in a molten state in amount adapted to reduce substantially all of the lead and antimony compounds present to other metallic state, separating the resulting lead-antimony alloy from the fused spent reagent, and adding further quantities of arsenic trioxide to the spent reagent in amount adapted to reduce the compounds of tin and to precipitate metallic tin, and separating the resulting tin from the fused spent reagent.

3. The method of treating so-called Harris salts which comprises adding arsenic trioxide to the salts while in a molten state in amount adapted to reduce substantially all of the lead and antimony compounds present to their metallic state, and separating the resulting lead-antimony alloy from the fused spent reagent.

4. The method of treating the oxysalts of a plurality of metals in the presence of an excess alkali metal compound such as caustic soda which comprises fusing together said oxysalts and alkali compound in the presence of arsenic trioxide, and adding antimony oxide dust to the molten mixture, said arsenic trioxide being present in amount to effect the reduction of substantially all of the antimony, and separating the reduced antimony from the spent reagent, adding cadmium oxide dust and arsenic trioxide in appropriate amounts to the partially spent molten slag adapted to produce a cadmium alloy from the spent reagent.

5. The method of treating alkali slags containing the oxysalts of lead, antimony and tin which comprises subjecting the alkali slags while in a molten state to the action of regulated amounts of arsenic trioxide, said arsenic trioxide being employed in amount to reduce the oxysalts of lead and antimony to form metallic lead and antimony, and separating the metallic lead and antimony from the spent reagent.

6. The method of treating alkali slags containing the oxysalts of lead, antimony and tin which comprises subjecting the alkali slags while in a molten state to the action of regulated amounts of arsenic trioxide, said arsenic trioxide being employed in amount to reduce the oxysalts of lead and antimony to form metallic lead and antimony, separating the metallic lead and antimony from the spent reagent, adding more arsenic trioxide to the molten mixture until it stiffens into a mass and becomes substantially saturated with respect to arsenate whereby tin prills are formed, and separating the tin from the rest of the mixture by leaching away the soluble constituents of the same.

7. The method of treating alkali slags containing the oxysalts of lead and tin which comprises subjecting the alkali slags while in a molten state to the action of regulated amounts of arsenic trioxide, said trioxide being employed in amount to reduce the oxysalts of lead to form metallic lead, and separating the metallic lead from the spent reagent.

8. The method of treating alkali slags containing the oxysalt of bismuth which comprises subjecting the alkali slags while in a molten state to the action of regulated amounts of arsenic trioxide, said arsenic trioxide being employed in amount adapted to reduce the oxysalt of bismuth to metallic bismuth, and separating the metallic bismuth from the spent reagent.

9. In the method of treating caustic alkali slags containing one or more metallic oxysalt impurity obtained in the refining of metals to recover the metallic impurities, the steps which comprise subjecting the caustic alkali slags containing the metallic oxysalt impurity while in a molten state to the action of regulated amounts of arsenic trioxide, said arsenic trioxide being used in amount to reduce the metallic oxysalt impurity to form a metal, and separating the metal from the spent reagent.

In testimony whereof I affix my signature.

GUSTAF NEWTON KIRSEBOM.